tates Patent Office 2,861,081
Patented Nov. 18, 1958

2,861,081

PROCESS FOR MAKING ALKYLDIOXOLANES

Peter S. Petrie, Midland, Mich., assignor to The Dow Chemical Company, Midland, Mich., a corporation of Delaware No Drawing. Application July 3, 1957
Serial No. 669,719

5 Claims. (Cl. 260—340.9)

This invention relates to processes for the rearrangement of alkenyl monoethers of vicinal glycols whereby alkyldioxolanes are produced.

The alkenyl ethers to which the process is applicable are those having the formula

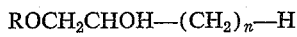

wherein R is a $\beta$-alkenyl radical containing 3 to 4 carbon atoms and $n$ is an integer from 0 to 2. Thus, they are the allyl, methallyl, crotyl and 1-buten-3-yl ethers of ethylene, propylene and butylene glycols.

The alkyldioxolanes produced in the process have the formula

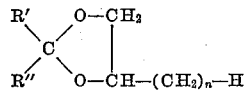

wherein R' and R'' are hydrogen or alkyl radicals and together contain 2 to 3 carbon atoms and $n$ is an integer from 0 to 2.

According to the invention, alkenyl ethers of the above described type are contacted with a conventional hydrogenation catalyst at a temperature of about 50 to 200° C., preferably about 100 to 175° C., for a time sufficient to effect substantial rearrangement of the ether to dioxolane. The time will depend largely on the catalyst and temperature but is usually in the range of 1 to 10 hours. The catalyst may be platinum, palladium, nickel, or other conventional hydrogenation catalyst and should, of course, be in a finely divided form or in such physical form that it has a high surface-to-volume ratio. It may be prepared in any manner suitable for the preparation of hydrogenation catalysts.

No solvent is required for the process of the invention and, in general, it is preferred to operate without one, though one may be used if desired. Any inert liquid that dissolves the ether used in the process may be used, suitable ones being cyclohexane, ethers, alcohols and the like.

The practice of the invention is illustrated by the following typical example:

Two gram-moles of 2-allyloxyethanol and 10 g. of palladized charcoal containing 5% of palladium were placed in a reactor and heated at 145° for 3 hr., with continuous agitation. The mixture was then cooled, the catalyst filtered out, and the product then fractionally distilled under reduced pressure. 2-ethyldioxolane was obtained in an amount corresponding to a conversion of 28% of the allyl ether. Somewhat higher conversions are obtained by the use of longer reaction times and/or higher temperatures. Unconverted alkenyl ether can be recycled, of course.

Similar results are obtained when other hydrogenation catalysts, such as platinum, Raney nickel or supported nickel are substituted for the palladized charcoal and when other alkenoxyalkanols, such as 1-allyloxy-2-proponal, 1-allyloxy-2-butanol or the corresponding methallyl, crotyl or 1-buten-3-yl ethers are substituted for the allyloxyethanol.

I claim:

1. A process for making a 4-alkyl-1,3-dioxolane comprising heating a compound having the formula ROCH$_2$CHOH—(CH$_2$)$_n$—H wherein R is a $\beta$-alkenyl radical containing 3 to 4 carbon atoms and $n$ is an integer from 0 to 2, in the presence of a hydrogenation catalyst selected from the group consisting of platinum, palladium and nickel and at a temperature of about 50 to 200° C.

2. A process as defined in claim 1 wherein the catalyst is palladium.

3. A process as defined in claim 1 wherein R is an allyl radical.

4. A process as defined in claim 1 wherein $n$ is zero.

5. A process for making 2-ethyldioxolane comprising heating 2-allyloxyethanol in the presence of a palladium catalyst and at a temperature of about 145° C.

References Cited in the file of this patent

FOREIGN PATENTS 497,668      Great Britain _____ Dec. 23, 1928